United States Patent
Lui et al.

(10) Patent No.: US 7,624,592 B2
(45) Date of Patent: Dec. 1, 2009

(54) FLEXIBLE POWER AND THERMAL ARCHITECTURES USING A COMMON MACHINE

(75) Inventors: Clarence W Lui, Diamond Bar, CA (US); Yu-Hang Ho, Torrance, CA (US); Chris Lee, El Segundo, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 699 days.

(21) Appl. No.: 11/435,997

(22) Filed: May 17, 2006

(65) Prior Publication Data
US 2007/0266695 A1   Nov. 22, 2007

(51) Int. Cl.
    *F25D 9/00* (2006.01)
(52) U.S. Cl. .......................................... 62/402; 60/224
(58) Field of Classification Search ................. 62/401, 62/402, 172, 434; 60/39.15, 39.17, 784, 60/224, 204; 123/560, 299, 316, 90.12, 568.11
See application file for complete search history.

(56) References Cited

U.S. PATENT DOCUMENTS

| | | | | |
|---|---|---|---|---|
| 4,347,711 A | * | 9/1982 | Noe et al. ...................... | 62/160 |
| 4,494,372 A | * | 1/1985 | Cronin ......................... | 60/785 |
| 5,133,228 A | * | 7/1992 | Takata et al. .................. | 477/33 |
| 5,442,905 A | * | 8/1995 | Claeys et al. .................. | 60/785 |
| 6,931,856 B2 | * | 8/2005 | Belokon et al. ............... | 60/772 |
| 2004/0074253 A1 | * | 4/2004 | Leathers ....................... | 62/401 |
| 2004/0118118 A1 | * | 6/2004 | Weber et al. .................. | 60/612 |
| 2005/0247284 A1 | * | 11/2005 | Weber et al. ................. | 123/299 |

* cited by examiner

*Primary Examiner*—Mohammad M Ali
(74) *Attorney, Agent, or Firm*—Stetina Brunda Garred & Brucker

(57) ABSTRACT

A power and cooling management system configured to flexibly couple various adaptive modules to an integrated power and cooling unit to suit any aircraft platform is provided. The integrated power and cooling unit has a compressor(s), power turbine(s), cooling turbine(s) and integral starter generator(s) mounted to the shaft of the power and cooling turbine. The integrated power and cooling unit may be pneumatically and/or pneumatically coupled to an adaptive module that comprises an additional compressor and an additional turbine or electrically coupled to a fuel cell which provides the main power after entering the full operation mode. When the engine includes an integral starter generator mounted thereto, the integral starter generator of the integrated power and cooling unit is operative to receive electric power from the engine mounted generator. Alternatively, a motor/generator may be mounted to the shaft of the additional turbine of the adaptive module.

19 Claims, 3 Drawing Sheets

FLEXIBLE POWER AND THERMAL ARCHITECTURES USING A COMMON MACHINE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates in general to power and cooling architectures, and more particular, to flexible power and cooling architectures integrated in a common machine.

In modern military aircraft design, system integration offers a balanced design in weight, performance, cost and volume that potentially yields an optimum system solution. In terms of air vehicle subsystem in recent years, a lot of emphasis has been placed on the integration of power and cooling systems. For example, in U.S. Pat. No. 4,684,081, a typical auxiliary power unit (APU) is mechanically coupled to an engine shaft and a heat exchanger is integrated to the downstream of a compressor to form a primary auxiliary power system. The engine power is used to compress ambient air for air conditioning as well as power production in flight. As understood, the mechanical linkage ultimately complicates the engine configuration. In U.S. Pat. No. 4,494,372, a compressor and a free turbine is added to the multi-role primary/auxiliary power system as disclosed in U.S. Pat. No. 4,684,081. The additional features did not reduce the complexity of the engine configuration.

U.S. Pat. No. 4,503,666 adds a cooling turbine and a complex clutch mechanism to an auxiliary power unit that provides engine starting function (pneumatically), supplemental power and environmental control function. U.S. Pat. No. 5,442,905 uses a turbo machine composed of a first open loop expansion turbine, a generator, a closed loop compressor and a second turbine to form a cooling and power system. It requires an uncoupled auxiliary power unit to perform engine starting, ground and emergency power generation, and higher-stage bleed air expansion is required to provide the engine to drive the closed loop circuit. In U.S. Pat. No. 5,490,645, a unit consisting of two turbo machine modules and associated heat exchangers and valves is proposed to provide power for engine starting, ground and emergency operation and environmental control. The unit operates as an independent system and requires full-time combustion in flight to compress the ambient air for cabin pressurization.

U.S. Pat. No. 6,415,595 discloses a turbo machine consisting two turbines and a compressor. U.S. Pat. No. 6,845,630 integrates a cooling and power turbine with a generator and a fan on the same shaft and uses preconditioned engine bleed air to produce power and cooling. Neither of the structure disclosed by U.S. Pat. No. 6,415,595 or 6,845,630 integrates the engine starting function, emergency power generation function, and cooling function. In both disclosures, an auxiliary power unit is required to perform these functions.

Although various approaches have been disclosed to address the power and cooling function, most of these approaches require a complex structure with unique machinery. It is therefore a substantial need to provide an architecture using a common machinery configuration and technologies which does not only improve the power and cooling efficiency, but is also easily reconfigured to be suitably adapted in various types of aircraft platforms.

BRIEF SUMMARY

A power and cooling management system configured to flexibly couple various adaptive modules to an integrated power and cooling unit to suit any aircraft platform is provided. The system includes an integrated power and cooling unit and an adaptive module pneumatically, electrically or both pneumatically and electrically connected to the integrated power and cooling unit. The integrated power and cooling unit includes a compressor, a power turbine located at downstream of the compressor, a cooling turbine, and an integral starter generator mounted to the shaft of the power and cooling turbine. The integrated power and cooling unit further includes a burner switched on during supplemental power demand and the engine starting mode.

In one embodiment, the cooling turbine and the compressor are coupled to an engine discharged air, while the adaptive module includes an additional compressor coupled to downstream of the compressor of the integrated power and cooling unit for receiving the bleed air thereof and an additional turbine located at downstream of the additional compressor. The integral starter generator is electrically connected to an engine gearbox mounted integral starter generator to receive the electrical power during normal operation mode, such that the usage of the engine discharged air can be minimized or eliminated. In the event of failure of the integrate power and cooling unit, the system can be reconfigured into a conventional bleed air cycle system with proper operation of an overboard valve and a return valve. The hybrid electric and pneumatic power structure provides higher cooling capacity, redundancy cooling circuit, and low energy consumption of the aircraft.

In the case that the engine does not include an integral starter generator mounted thereto, the power and cooling system may be reconfigured to incorporate an additional motor/generator mounted to the shaft of the additional turbine in the adaptive module to main power and to perform cooling function. Similar to more electric integration as discussed above, the compressor and the cooling turbine are coupled to the engine discharged air, while the bleed air of the compressor is fed into the additional compressor. However, in this embodiment, the cooling turbine of the integrated power and cooling unit is not coupled to any load or the cooled equipment. Instead, the low-temperature discharge air of the cooling turbine of the integrated power and cooling unit is used as a heat sink to cool down the outlet air temperature of the compressor of the integrated power and cooling unit. The air is then expanded in the additional turbine to produce work for generating power to the aircraft through the shaft mounted motor/generator of the adaptive module. This integrated power and cooling structure combines shaft energy and bleed energy required for cooling and power into a single low penalty energy source. Also, the size of the engine gearbox and the generator can be significantly reduced.

Instead of coupling the adaptive module as discussed above, the integrated power and cooling management system may integrate the integrated power and heat exchanger to support a fuel cell operation such that entire power and cooling system results in a revolutionary low fuel consumption system. The integrated power and cooling unit is operative to provide pneumatic air to the fuel cell and electric power to a fuel pump to start the fuel cell. The fuel cell, once in full operation, is responsible for the supply power of the overall aircraft and the integrated power and cooling unit. This fuel cell power approach requires nearly zero energy from the engine to produce cooling and power such that the engine can concentrate to supply 100% propulsive force to the aircraft.

A method of providing a flexibly reconfigured architecture using a common integrated power and cooling unit is also provided. The integrated power and cooling unit includes a compressor, a power turbine, a cooling turbine, and an integral starter generator mounted to the shaft of the power and the cooling turbine. The method includes the steps of (a) coupling the starter generator to an engine mounted starter generator to continuously receive electrical power therefrom; (b) coupling downstream of the compressor with an additional set of a compressor, a turbine and a generator for generating additional power; or (c) coupling the starter generator with a fuel cell. The step (a) further comprises pneumatically coupling the bleed air of the compressor to an additional set of a compressor and a turbine and coupling the compressor and the cooling turbine of the integrated power and cooling unit to an engine discharged air. In addition, the turbine of the additional set is coupled to liquid cooled equipment, while the cooling turbine of the integrated power and cooling unit is preferably coupled to air cooled equipment. The step (b) further includes the step of coupling the compressor and the cooling turbine to an engine discharged air and the step of coupling the cooling turbine of the integrated power and cooling unit to the compressor of the additional set.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
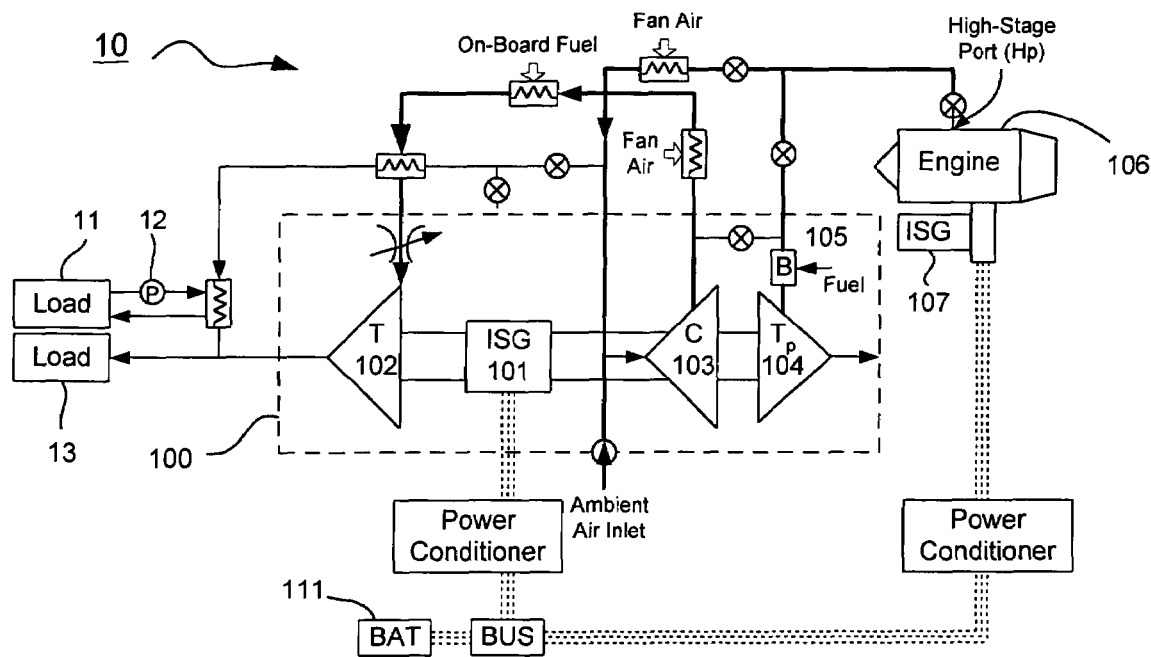
FIG. 1 illustrates an integrated power and thermal management system.

As shown in FIG. 1, a single turbine machine 100 is used to integrate the functionalities of engine starting, emergency power and thermal management into one system 10. As shown, the single turbine machine 100, namely, the integrated power and cooling unit (IPCU), includes an integral starter generator ISG 101, a cooling turbine T 102, a compressor C 103, a power turbine $T_p$ 104, and a burner B 105. The compressor 103 is supplied with an ambient air through a one-way valve, and the cooling turbine 102 is equipped with a geometric variable inlet. The integral starter generator ISG 101 is connected to a battery BAT 107 to receive electric power therefrom, so as to accelerate the turbine machine 100 to an ignition speed. Once the system is fired up, the compressor 103, the power turbine 104 and the burner 105 operate as a typical gas turbine engine and are ready to generate power and/or cooling. During the power generation mode, the shaft mounted integral starter generator ISG 101 acts as a generator converting the mechanical energy to electrical power. The power will be used to motor an engine gearbox mounted integral starter generator ISG 107 to accelerate the engine to the ignition speed. The power also produces emergency power during engine generator failure or engine flame out. For the majority of the time, the single turbo machine 100 operates as an environmental control system (ECS) to provide cooling for the liquid cooled and air cooled equipment as well as thermal control and pressurization for the cockpit. In this cooling mode, the burner 105 is switched off and the power turbine 104 uses the energy from the expansion of the discharge air of the engine 106 to drives the compressor 103 to form a semi-closed cooling circuit. The semi-closed loop air absorbs the waste heat from the liquid cooled equipment (the load 11) through a pump 12 and rejects the heat to the heat exchangers in the form of engine fan air and on-board fuel. The system also conditions the bleed air of the compressor 103 through a plurality of heat exchangers to provide an open loop cool air supply to the cockpit and air cooled equipment (denoted by load 13) through the cooling turbine 102. Through integration, this system combines environment control system and auxiliary power unit turbine machines into one single turbo machine 100, eliminates the airframe mounted accessory drive gearbox and the ram air ducting; and thus reduces installation volume. However, the decoupling from using the ram air as a heat sink causes the system to use additional bleed air to operation; and consequently, reduces the overall intended benefits to the air vehicle.

Figure 2:
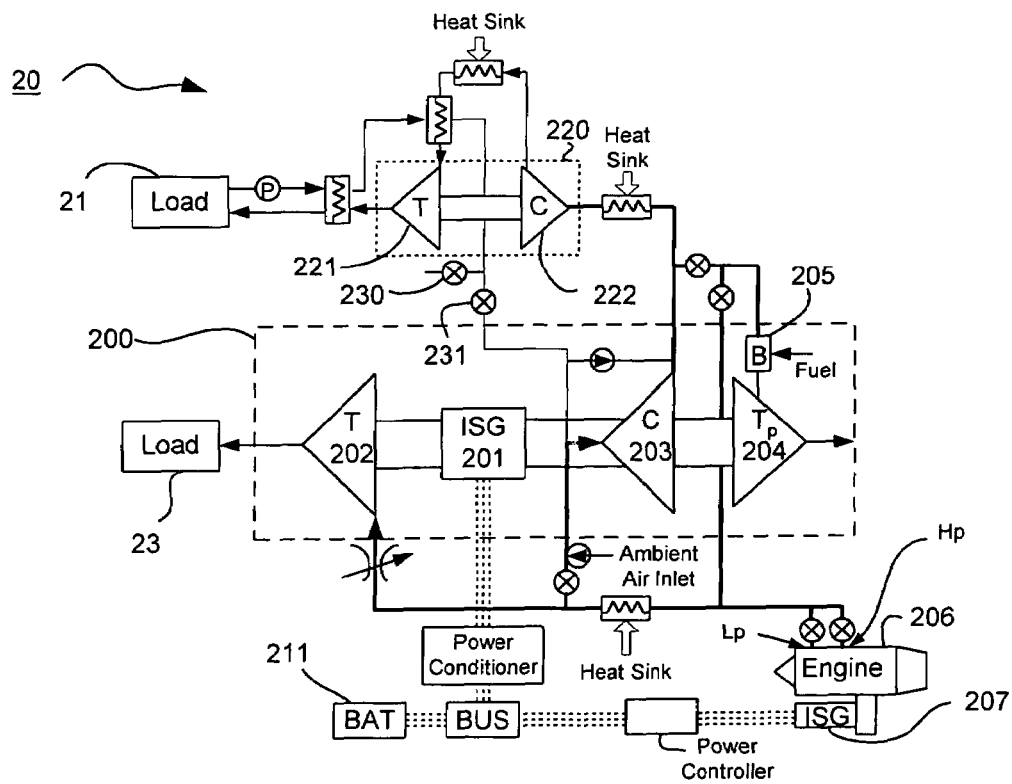
FIG. 2 shows an improved architecture of the integrated power and thermal management system as illustrated in FIG. 1.

FIG. 2 illustrates an improvement of the integrated power and thermal management system as shown in FIG. 1 which increases overall system cooling efficiency and capacity by using more electric power and the low stage bleed air. Similar to the system illustrated in FIG. 1, the improved system 20 includes an integrated power and cooling unit 200 to provide the emergency power generation and the electrical power for engine start. As shown, the integrated power and cooling unit 200 includes an integral starter generator 201, a cooling turbine 202, a compressor 203, a power turbine 204 and a burner 205. A high-speed turbo machine 220, namely, an air cycle machine (ACM), that comprises a turbine 221 and a compressor 222 is pneumatically coupled to the downstream of the compressor 203 of the integrated power and cooling unit 200. The connection of the integrated power and cooling unit 200 and the air cycle machine 220 forms a closed loop cooling air circuit to absorb and reject the waste heat from the liquid cooled equipment 21 to the heat sinks in various forms, including ram air, fan air, low temperature fuel and/or advanced high-temperature fuel, depending on the air vehicle design, mission objectives and engine configurations.

As discussed above, the integral starter generator 101 in the integrate power and cooling unit 100 of the system as illustrated in FIG. 1 will be idling in the standby mode once the engine has been started and the integrate power and cooling unit 100 will be driven using discharge air of the engine 106. In this embodiment, the improved architecture will motor the integral starter generator 201 of the integrated power and cooling unit 200 with electrical power from the integral starter 207 mounted to the engine gearbox 206 to drive the integrated power and cooling unit 200. Thereby, the use of engine discharge air will be eliminated or minimized.

The coupling of the compressor 103 and the cooling turbine 102 of the system 10 as shown in FIG. 1 also limits the air expansion potential in the cooling turbine 102 and penalizes the power extraction and cooling performance. More specifically, as the air expansion in the cooling turbine 102 is limited by the inlet pressure control of the compressor 103, the power extraction and cooling performance are often degraded. To resolve such issue, in the improved architecture as shown in FIG. 2, the compressor 103 is decoupled from the cooling turbine 102 and coupled to the compressor 222 of the air cycle machine 220. The decoupling of compressor 203 from cooling turbine 202 allows the pressurized engine air from 206 to expanse further in the cooling turbine 202. The additional air expansion produces colder supply air and extracts more power from the cooling turbine 202, and the additional power extracted from the cooling turbine 202 can be used to supplement the electric power required to drive the integrated power and cooling unit 200 thus minimizes the power required from the power turbine 204. The integration feature of using hybrid electric power and pneumatic power allows the system to operate with a lower stage engine discharge air opposed to the prior art using high stage engine discharge air, minimizing the penalty incurred on the engine for power and cooling functions. Evidently, the improved architecture using more electric power and lower penalty engine discharge air is more efficient (less penalty) than the system that uses significant amount of discharge air from the engine compressor as the sole energy source for the power turbine.

The coupling to the air cycling machine 220 provides a redundant cooling feature which is available even in the event of a failure of the integrated power and cooling unit 200. In the event of the integrated power and cooling unit failure, the improved architecture as illustrated in FIG. 2 can be reconfigured into a bleed air cycle system with proper operation of the overboard valve 230 and return valve 231. To ensure adequate cooling performance during low engine power operation in the failure mode, the engine bleed supply will retain the higher-stage bleed port (use only during emergency).

In general, the optimal design for the integrated power and cooling 200 is sized to provide the engine start power. The design driver is the pressure and flow delivered by the compressor 201. In the system 10 as shown in FIG. 1, the cooling capacity with respect to system flow is designed to operate at the optimum pressure of the compressor 103, which is a minimum of 10% margin below the surge limit of the compressor 103. Further increase of the flow to obtain higher system capacity requires the compressor 103 to deliver higher output pressure, reducing the surge margin and/or requiring size increase of the compressor 103. In this embodiment, the air cycle machine 220 operates as an "adaptive module", which is an individual bootstrap device that the high pressure required to produce additional flow will take place within the air cycle machine 220 without adversely impacting the compressor 203 of the integrated power and cooling unit 200. A portion of the high-pressure output of the air cycle machine 220 is used to increase the pressure loss allocation for the heat exchangers to therefore result in lighter and more compact heat exchanger that offsets the weight of the added air cycle machine 220.

The improved architecture 20 shifts the driving force from the power turbine 204 to the integral starter generator 201 and the cooling turbine 222, thus in turns allowing the power turbine 204 for further integration function. The integration function depends on the air vehicle application. In the example of a supersonic speed aircraft where ram air has high pressure and temperature, it is plausible to expand the ram air in the power turbine 204 to lower temperature for use in bay ventilation and cooling. The expansion in the power turbine 204 also provides supplemental power to the integrated power and cooling unit 200 and further reduces the input energy required from other power sources such as the engine.

Figure 3:
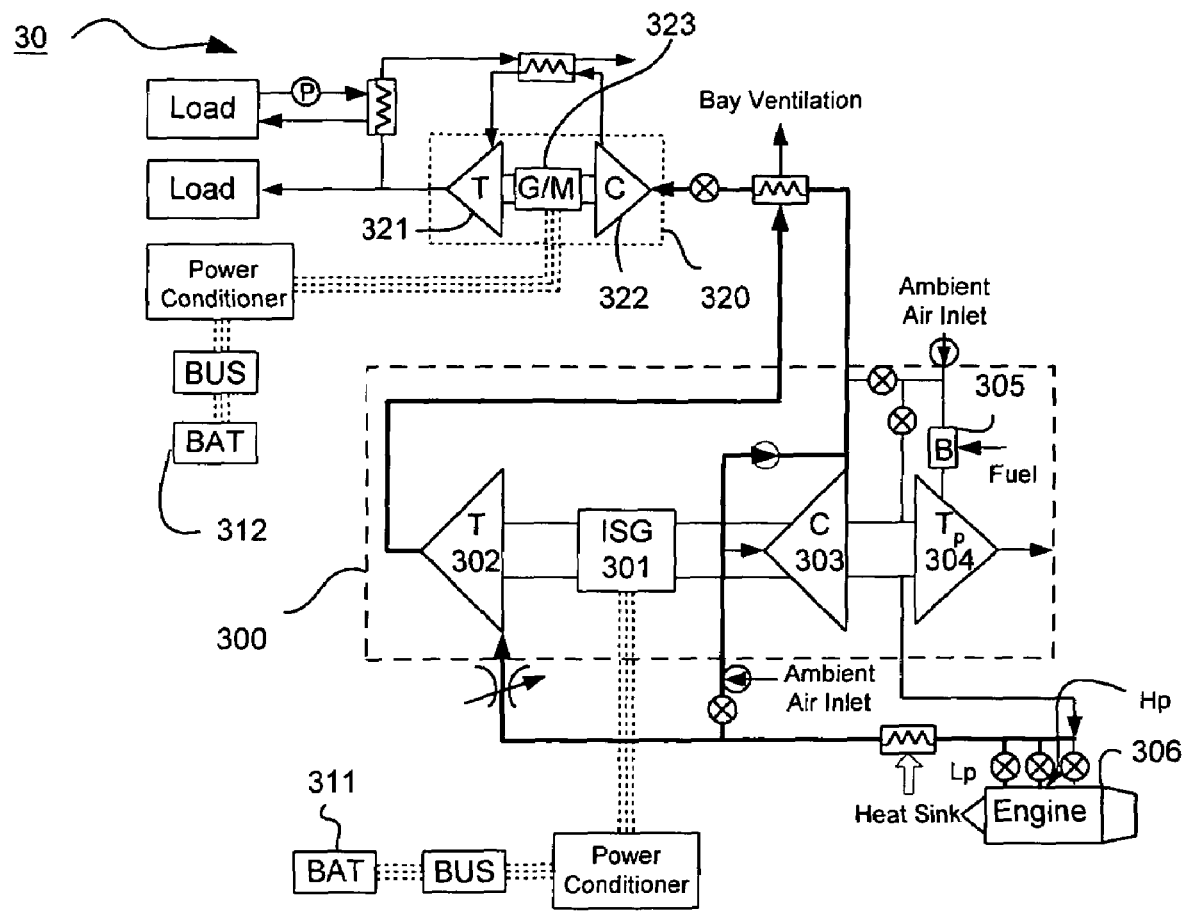
FIG. 3 shows another improved architecture of the integrated power and thermal management system as illustrated in FIG. 1.

The improved architecture 20 as shown in FIG. 2, addresses improvement of cooling and power efficiency, and lays a foundation for further integration of cooling and power functionalities. FIG. 3 shows another embodiment which suggests to remove the main power generation function from the engine and integrates an aircraft cooling function to form an overall power and cooling system. A simpler engine configuration with a single source of energy to perform power and cooling is formed. The expectation is a lighter weight engine with reduced gearbox size, higher efficiency for utility function and ultimately improved power rating and fuel consumption of the engine.

As shown in FIG. 3, the architecture 30 is designed with the similar turbo machine with same technologies, that is, the same integrated power and cooling unit configuration as the previous embodiment. The integrated and cooling unit 300 includes an integral starter generator 301, a cooling turbine 302, a compressor 303, a power turbine 304 and a burner 305. However, the engine 306 does not include an integral starter generator mounted thereto, while the integrated power and cooling unit 300 is coupled in series with another high-speed bootstrap turbo generator 320 to produce the main power supply and cooling to the aircraft. In this embodiment, low- or mid-stage engine discharge air is used as the single energy source from the engine 306 for generating power and cooling during the normal operation. The air temperature is first reduced by ram air and/or fuel and then fed to the cooling turbine 302 and the compressor 303. To take full advantage of the energy of the pressurized engine air, the air expands to near ambient static pressure in the cooling turbine 302. The energy from the expansion is used to generate power through the integral starter generator 301 and further compresses the engine bleed air in the compressor 303. The low temperature discharge air from the cooling turbine 302 is used as a heat sink to reduce the outlet air temperature of the compressor 303 by means of a heat exchanger. The pressurized and reduced temperature air from the compressor 303 is then fed to the bootstrap turbo generator 320 where the air pressure is further increased by the bootstrap action in the compressor 322. This air is then expanded in the turbine 321 to produce work for generating power to the aircraft through the shaft mounted motor/generator 323. The resultant cold discharge air at the outlet of the turbine 321 is the main source of cooling for the liquid cooled equipment and is subsequently used as a regenerative heat sink for the bootstrap compression by compressor 322. Part of the turbine discharge air can also be used for the air cooled equipment, cockpit pressurization and thermal control.

For engine starting, the integrated power and cooling unit 300 performs as a typical gas turbine engine with the pressurized air bled off from the compressor 303 and directly fed to the engine turbine section in 306 to accelerate the engine to the ignition speed.

For normal operation at the fuel efficient demand cruise condition, low-stage (engine fan or near fan stage) engine bleed air has sufficient energy to perform both power and cooling function by design. During the low engine power operation or emergency conditions with one or more generator failures, the system is incorporated with a higher stage bleed capability from the engine for increased energy input. Unlike the system 10 where shaft power and bleed air energy are required to perform power and cooling function, the present architecture uses low stage bleed air to perform both functions, thus reduces energy usage and improves system efficiency.

The exhaust air after the regenerative cooling from both the integrated power and cooling unit 300 and the bootstrap turbo generator can be used to supplement the bay ventilation airflow, which provides another integration value/benefit. The speed of engine gear box mounted generator incorporated in the system 10 or 20 dictates the generator size. In this embodiment, the bootstrap turbo generator is anticipated to be a high-speed unit with the potential to reduce the unit size. Coupled with the engine gear box reduction due to the elimination of the generator, the architecture as provided in this embodiment is expected to significantly reduce the overall weight with improved system efficiency. To further allow the engine to provide 100% propulsion power to the aircraft, the engine bleed air can be completely shut off. In this mode, fuel will be supplied to burner 305 of the integrated power and cooling unit 300 and combusted with the compressed ambient air from 303. The high pressure and temperature combusted air expands in power turbine 304 to produce power to operate the unit 300.

Figure 4:
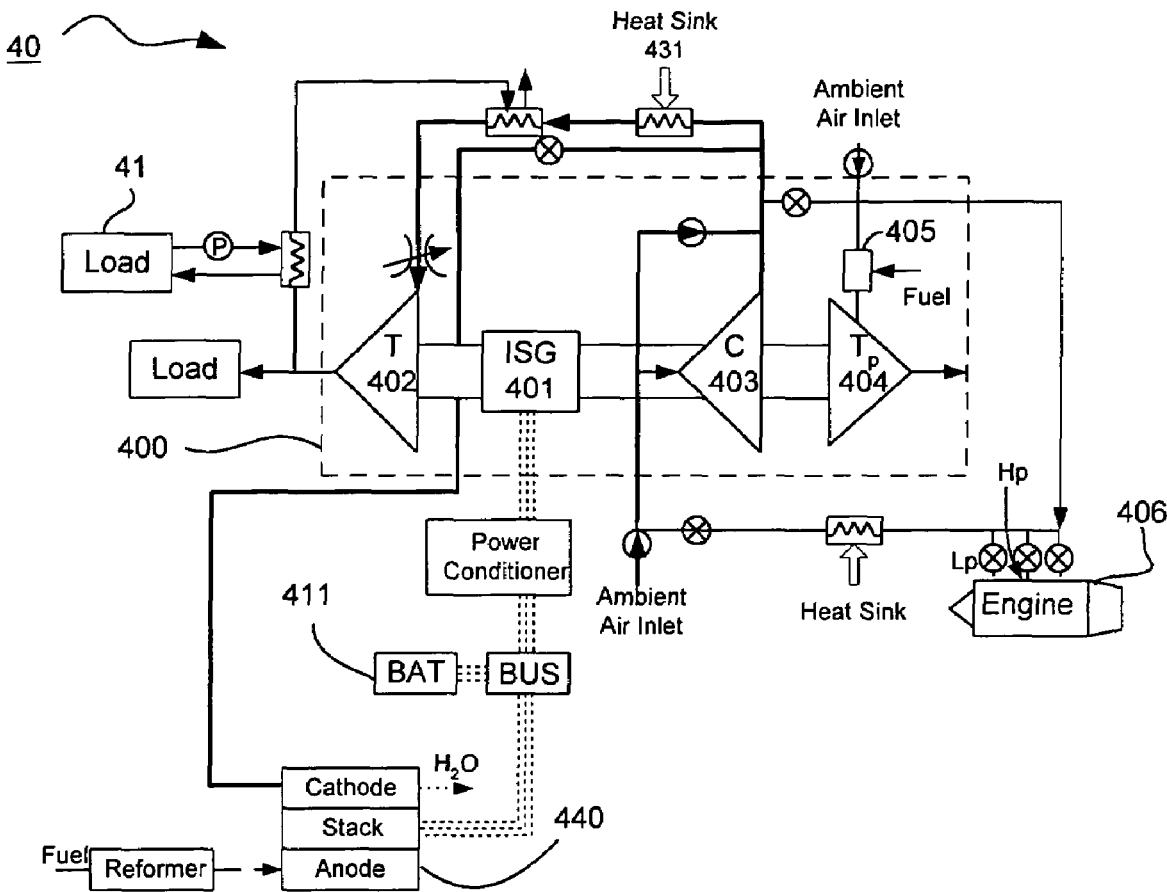
FIG. 4 shows another improved architecture of the integrated power and thermal management system as illustrated in FIG. 1.

The complete power and cooling integration concept of the previous embodiment suggests removing the power generation duty from the engine mounted generator but still requires a mechanical drive generator to provide power for the aircraft. FIG. 4 shows another embodiment which further explores the autonomy power and cooling design that operates without a mechanical rotating dynamic during normal operation. The concept is to integrate the integrated power and cooling unit turbo machine and heat exchangers to support the fuel cell operation such that the entire power and cooling system results in a revolutionary low fuel consumption system. As shown in FIG. 4, in addition to the normal power and cooling functionalities, the integrated power and cooling unit 400 and the heat exchangers also act as the supporting devices to produce pressurized and temperature control air for the fuel cell stack 440. As a result, this architecture forms an overall integrated power and cooling system that is independent of the conventional generator and the engine supply energy source.

Similar to the previous embodiments, the integrated power and cooling unit 400 will self start with the power of the battery 411 using the integral starter generator 401. Once started, the integrated power and cooling unit 400 operates as a typical gas turbine engine similar to the embodiment as shown in FIG. 3 and is ready to deliver pneumatic air to the engine turbine section in 406 for engine starting. The integrated power and cooling unit 400 also provides pneumatic air to the fuel cell 440 and electric power to the fuel pump to drive the integrated power and cooling unit 400. With the power from the fuel cell 440, the integral starter generator 401 of the integrated power and cooling unit 400 will be in motoring mode to drive the compressor 403 to raise the pressure of the ambient air. The temperature of the compressed air is first reduced by heat sink such as ram air or fuel. The temperature of the compressed air is further reduced by the regenerative cooling air after absorbing the liquid cooling load 41. A portion of the pre-conditioned compressed air will be delivered to the fuel cell 440. To ensure a constant temperature supply, a valve is incorporated to mix the hot compressor discharged air with the pre-cooled air.

The majority portion of the pre-cooled compressed air is expanded in the cooling turbine 401 with the work extracted from the expansion returning to drive the shaft. The resultant cool air is used to absorb the liquid load as well as the air cooled equipment load, and to provide cockpit thermal management and pressurization source. The power turbine 404 is in standby mode, expanding ram air to reduce rotational drag, while the fuel cell 440 provides the main power source. During the emergency power mode where the fuel cell failed or additional power is required to supplement the fuel cell 440, the engine bleed air will be expanded in the power turbine to drive the integrated power and cooling unit 400. The burner 405 can be on or off depending on the condition. Since electric power generation is no longer depending on the engine power, engine flame out will not impact the power generation.

It is evident that the integrated power and cooling units 200, 300 and 400 of the embodiments as shown in FIGS. 2, 3 and 4, respectively, have a similar configuration and are based on the same technologies.

In addition to the components as described above, as shown in FIGS. 1-4, each of the architecture further comprises a plurality of valves for pressure regulation or switch on/off control, a plurality of one-way check valves for directing the ambient air into various locations of the architecture, at least one power conditioner for controlling power supplied to various parts of the air vehicle, at least one bus for power distribution, and at least one battery.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A power and cooling system, comprising:
an integrated power and cooling unit, comprising:
a first compressor connected to a discharged air inlet of an engine;
a power turbine located at downstream of the compressor;
a cooling turbine connected to the engine discharged air; and
a first starter generator mounted to a common shaft of the power and cooling turbine; and
an adaptive module pneumatically coupled to the integrated power and cooling unit, the adaptive module comprising:
a second compressor pneumatically coupled to downstream of the first compressor; and
a turbine located at downstream of the second compressor.

2. The system of claim 1, wherein the integrated power and cooling unit further comprises a burner switched off the engine has been started.

3. The system of claim 1, further comprising a heat exchanger for adjusting temperature of the engine discharged air supplied to the first compressor and the cooling turbine.

4. The system of claim 1, further comprising a second starter generator mounted to the engine and electrically connected to the first starter generator.

5. The system of claim 4, wherein the first starter generator is operative to receive electricity from the second integral generator for driving the integrated power and cooling unit during normal operation mode after the engine is started.

6. The system of claim 5, wherein the cooling turbine is coupled to air cooled equipment.

7. The system of claim 5, wherein the turbine of the adaptive module includes a cooling turbine.

8. The system of claim 7, wherein the cooling turbine of the adaptive module is coupled to liquid cooled equipment.

9. The system of claim 8, wherein the adaptive module further comprises a plurality of heat sinks in the form of ram air, fan air, low temperature fuel, advanced high-temperature fuel, or any combination thereof.

10. The system of claim 9, wherein the cooling turbine of the adaptive module is operative to absorb and reject waste heat from the liquid cooled equipment to the heat sinks.

11. The system of claim 4, further comprising an overboard valve and a return valve to configure an architecture into a bleed air cycle system in the event of a failure of the integrated power and cooling unit.

12. The system of claim 1, wherein the adaptive module further comprises a generator mounted to a shaft of the turbine thereof.

13. The system of claim 12, wherein the cooling turbine is operative to expand the engine discharged air for driving the first starter generator, so as to further compress an engine bleed air of the first compressor.

14. The system of claim 12, wherein an air discharged by the cooling turbine is pneumatically coupled to the second compressor of the adaptive module.

15. The system of claim 14, further comprising a second heat exchanger for coupling an air discharged from the cooling turbine and the bleed air of the first compressor before supplied the second compressor.

16. The system of claim 15, wherein the second heat exchanger is configured for bay ventilation.

17. The system of claim 15, wherein the turbine of the adaptive module is coupled to air cooled equipment.

18. The system of claim 15, wherein the turbine of the adaptive module is coupled to liquid cooled equipment.

19. The system of claim 18, further comprising a plurality of heat sinks allows the turbine of the adaptive module to absorb and reject heat from the liquid cooled equipment.

* * * * *